(12) United States Patent
Rosenblatt

(10) Patent No.: US 10,943,001 B2
(45) Date of Patent: *Mar. 9, 2021

(54) BLUETOOTH DEVICE AS SECURITY ACCESS KEY

(71) Applicant: Apple Inc., Cupertino, CA (US)

(72) Inventor: Michael Rosenblatt, Campbell, CA (US)

(73) Assignee: Apple Inc., Cupertino, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 16/516,107

(22) Filed: Jul. 18, 2019

(65) Prior Publication Data

US 2020/0015086 A1 Jan. 9, 2020

Related U.S. Application Data

(63) Continuation of application No. 15/652,099, filed on Jul. 17, 2017, now Pat. No. 10,362,424, which is a continuation of application No. 14/263,914, filed on Apr. 25, 2014, now abandoned, which is a continuation of application No. 11/823,656, filed on Jun. 27, 2007, now abandoned.

(51) Int. Cl.
*G06F 21/35* (2013.01)
*H04L 29/06* (2006.01)
*H04W 12/08* (2021.01)

(52) U.S. Cl.
CPC .......... *G06F 21/35* (2013.01); *H04L 63/0876* (2013.01); *H04W 12/08* (2013.01)

(58) Field of Classification Search
None
See application file for complete search history.

(56) References Cited

U.S. PATENT DOCUMENTS

| | | |
|---|---|---|
| 5,960,085 A | 9/1999 | De La Huerga |
| 6,067,477 A | 5/2000 | Wewalaarachchi et al. |
| 6,323,846 B1 | 11/2001 | Westerman et al. |
| 6,430,358 B1 | 8/2002 | Yuen et al. |
| 6,836,843 B2 | 12/2004 | Seroussi et al. |
| 6,851,054 B2 | 2/2005 | Wheeler et al. |
| 6,996,402 B2 | 2/2006 | Logan et al. |
| 7,158,756 B2 | 1/2007 | Palin et al. |
| 7,516,325 B2 | 4/2009 | Willey |
| 7,589,616 B2 | 9/2009 | Klatsmanyi et al. |
| 7,636,549 B2 | 12/2009 | Ma et al. |
| 7,643,817 B2 | 1/2010 | Klug et al. |

(Continued)

*Primary Examiner* — Benjamin E Lanier
(74) *Attorney, Agent, or Firm* — Dickinson Wright RLLP

(57) ABSTRACT

This application is directed to a system for remotely directing a host device to perform an operation using a key. The key may include a communications circuitry for transmitting data, for example a key identifier or an instruction to perform an operation, within a personal area network created by the communications circuitry. When a host device is within the personal area network, the key may transmit data received by a transceiver on the host device. In response to receiving the data, the host device may perform an operation (e.g., an authentication operation). In some embodiments, the key may transmit data identifying an operation for the host device to perform. In some embodiments, the host device may store in memory key identification information and an associated operation which may be retrieved when the key is brought in proximity of the host device.

20 Claims, 8 Drawing Sheets

(56) References Cited

U.S. PATENT DOCUMENTS

| | | |
|---|---|---|
| 7,821,386 B1 | 10/2010 | Barrett et al. |
| 10,362,484 B2 | 7/2019 | Rosenblatt |
| 2001/0021980 A1 | 9/2001 | Linden et al. |
| 2002/0081972 A1 | 6/2002 | Rankin |
| 2002/0082921 A1 | 6/2002 | Rankin |
| 2002/0130834 A1 | 9/2002 | Madarasz et al. |
| 2002/0141586 A1 | 10/2002 | Margalit et al. |
| 2003/0025604 A1 | 2/2003 | Freeman |
| 2003/0028811 A1 | 2/2003 | Walker et al. |
| 2003/0065918 A1 | 4/2003 | Willey |
| 2003/0220114 A1 | 11/2003 | Langensteiner et al. |
| 2004/0111360 A1 | 6/2004 | Albanese |
| 2004/0137855 A1 | 7/2004 | Wiley et al. |
| 2004/0163073 A1 | 8/2004 | Krzyzanowski et al. |
| 2005/0015618 A1 | 1/2005 | Schneider et al. |
| 2005/0062238 A1 | 3/2005 | Broadfield et al. |
| 2005/0076242 A1 | 4/2005 | Breuer |
| 2005/0204144 A1 | 9/2005 | Mizutani |
| 2006/0128351 A1 | 6/2006 | Hassan et al. |
| 2006/0259184 A1 | 11/2006 | Hayes et al. |
| 2007/0152983 A1 | 7/2007 | McKillop et al. |
| 2007/0197261 A1 | 8/2007 | Humbel |
| 2009/0006846 A1 | 1/2009 | Rosenblatt |
| 2014/0237229 A1 | 8/2014 | Rosenblatt |
| 2018/0041902 A1 | 2/2018 | Rosenblatt |

# BLUETOOTH DEVICE AS SECURITY ACCESS KEY

CROSS-REFERENCE TO RELATED APPLICATIONS

This application is a continuation of U.S. patent application Ser. No. 15/652,099, entitled BLUETOOTH DEVICE AS SECURITY ACCESS KEY," filed Jul. 17, 2017, set to issue Jul. 23, 2019 as U.S. Pat. No. 10,362,484, which is a continuation of U.S. patent application Ser. No. 14/263,914, entitled "BLUETOOTH DEVICE AS SECURITY ACCESS KEY" filed Apr. 28, 2014, which is a continuation of U.S. patent application Ser. No. 11/823,656 entitled "BLUETOOTH DEVICE AS SECURITY ACCESS KEY" filed Jun. 27, 2007, the contents of all of which are incorporated by reference herein in their entirety for all purposes.

BACKGROUND

This invention is directed to a key that uses a short range communications protocol to direct a host S device to perform an operation.

To perform an operation with a device, whether an electronic device, mechanical device, or other device, users typically need to provide inputs on a user interface. In some cases, the user may provide inputs using a remote controller that directs the device to perform operations based on the user's inputs on the remote controller.

Whether the user input is provided directly on the device or remotely, the user must nevertheless press a key, or perform some other action for the device to perform an operation. The operation is not performed in response to the user approaching the device.

There is a need, therefore for a system by which a user can bring a key in a communications proximity with a host device and cause the host device to automatically perform an operation. In particular, there is a need for a system in which a user can bring a key in a communications proximity with an electronic device to cause the electronic device to automatically log in the user or load the user's profile.

SUMMARY

A system that includes a key for remotely causing a host device to perform an operation is provided. In some embodiments, the key may be configured to cause a host device to automatically log in a user associated with the key, or load the user's profile.

A key that includes communications circuitry may be provided. Using the communications circuitry, the key may be configured to create a relatively short-range personal area network. The key may use any suitable communications protocol to create the personal area network including, for example, Wi-Fi communications (e.g., one of the 802.11 standards), Bluetooth, Nordic, high frequency systems (e.g., 900 MHz, 2.4 GHz, and 5.6 GHz communication systems), short-range radio circuitry (e.g., walkie-talkie type circuitry), infrared, and other relatively localized wireless communication protocols.

The key may be incorporated or integrated in any suitable device. For example, the key may be a key fob, a card (e.g., a credit card shaped device), a portable drive (e.g., a flash drive), a widget (e.g., a coin-sized object), or any other suitable device or object that may be unobtrusively carried in or clipped to a user's pocket, bag, or other possession. In some embodiments, the key may be inserted inside a user (e.g., surgically inserted under a user's skin). In some embodiments, the key or its functionality may be incorporated in an electronic device, for example in a cellular telephone, a mobile communications device, a pocket-sized personal computer (e.g., an iPAQ or a Palm Pilot) a personal media device (e.g., an iPod), a camera, a video recorder, a computer (e.g., a laptop computer), a key (e.g., car keys), a remote controller, or any other suitable electronic device.

A host device that includes a transceiver and an actuator may be provided. The transceiver may be configured to communicate with the communications circuitry of the key when the host device is within the personal area network created by the key. The actuator may be any suitable component operative to move the host device from a first position or state to a second position or state. For example, the actuator may include a motor, a switch (e.g., for turning a device or a function on or off, a processor (e.g., for performing an operation in response to instructions from software in an electronic device), or any other suitable actuator.

The host device may be any suitable device in which an operation may be performed when a key is brought in proximity of the host device. For example, the host device may include a computer, a cellular telephone, a mobile communications device, a personal media device, a set-top box, a television system, or any other suitable electronic device. In such cases, the operation may include for example, authenticating a user to the system (e.g., logging in the user), loading a user's settings (e.g., a user's preference profile), dialing a telephone number, opening a program (e.g., opening a user's e-mail software), activating a peripheral, activating a system coupled to the device (e.g., starting an automobile's engine), or any other suitable operation. As another example, the host device may include an automobile or other vehicle, a door or window, a gate or turnstile, a garage door, or any other device or system for which a key or pass is required. As still another example, the host device may include a light or light switch, curtains or shades, an elevator, a conveyer belt, a motorized device, or any other device that can be moved from a first position or state to a second position or state.

when a key is brought in proximity of a host device such that the host device is within the personal area network created by the key, the communications circuitry of the key and the transceiver of the host device may communicate data. In some embodiments, the key may broadcast identification information to the host devices in the personal area network (e.g., broadcast a unique identifier). In response to receiving the broadcast, the host device may transmit identification information to the key. Once the key has identified the host device within the personal area network, the key may transmit an instruction to the host device to perform an operation. For example, the key may direct the host device to automatically log in a user (e.g., the user associated with the key). In some embodiments, the user may specify the instruction sent to the host device by the key (e.g., using a user interface on the key or a base coupled to the key).

In some embodiments, after receiving a broadcast from the key, the host device may retrieve from memory an operation associated with the identified key. The host device may then perform the retrieved operation (e.g., after authenticating the key). In some embodiments, a user may set-up a host device to perform a particular operation when the host device is within the personal area network of the key using the user interface of the device.

In some embodiments, the host device may be configured to perform the specified operation so long as the host device is within the personal area network created by the key. The host device may periodically request a transmission from the key to determine whether the key is still sufficiently proximate to the device, or the key may periodically send transmissions to notify devices of its presence. When a host device is no longer within the personal area network of the key, the host device may cease to perform the operation. In some embodiments, the host device may return to its prior state (e.g., log the user off of the host device).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
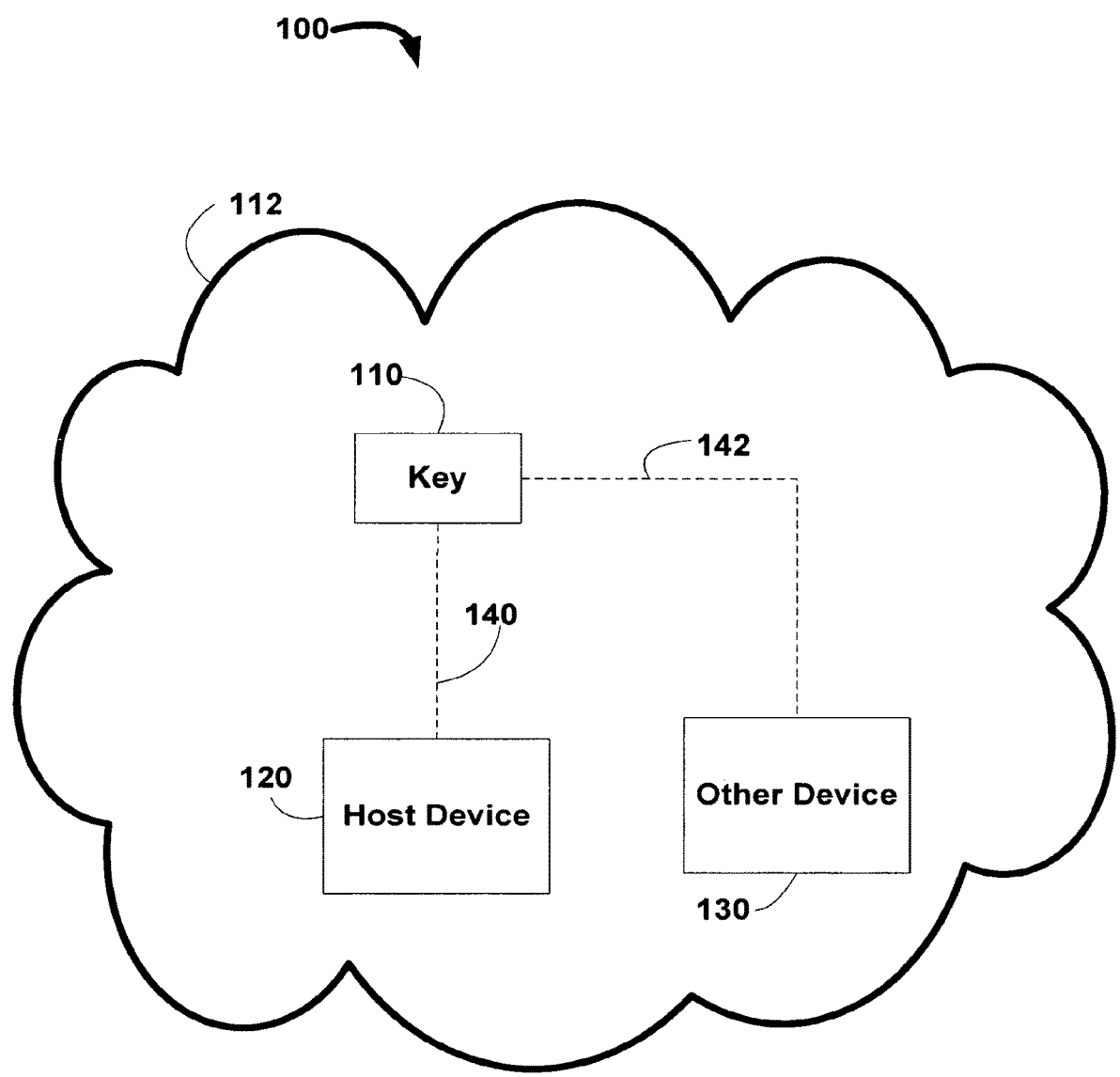
FIG. 1 is a simplified block diagram of a network system that includes a key, a host device and another device in accordance with one embodiment of the invention.

FIG. 1 is a simplified block diagram of a network system in accordance with one embodiment of the invention. System 100 may include key 110, host device 120 and other device 130. In some embodiments, system 100 may include a plurality of keys 110 and host and other devices 120 and 130. To avoid overcomplicating the drawing, only one of each is shown.

Key 110 may include circuitry providing communications network 112, which may be a relatively short-range communications network. Using network 112, key 110 may be capable of performing wireless communication with a relatively short-range wireless communication protocol such as Wi-Fi (e.g., a 802.11 protocol), Bluetooth (registered trademark), high frequency systems (e.g., 900 MHz, 2.4 GHz, and 5.6 GHz communication systems), infrared, other relatively localized wireless communication protocol, or any combination thereof. Devices located within communications protocol network 112 may wirelessly communicate over a local wireless communication path such as paths 140 and 142. As defined herein, a local wireless communication path enables wireless communication using a short-range communications protocol. When a device (e.g., host device 120) is not within network 112, that device may be out of range and not able to wirelessly communicate with key 110.

In one embodiment, the short range communications circuitry may be integrated within the packaging of key 110 (e.g., integrated into a printed circuit board of the device), or in other embodiments, may be included in an accessory device that is docked or connected to key 110. The accessory device may be, for example, a relatively unobtrusive device that provides key 110 with short-range communicating functionality. Examples of key 110 may include, for example, a media player such as an iPod available by Apple Computer Inc., of Cupertino, Calif., a key fob, a cellular telephone, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system). In some embodiments, key 110 may be incorporated in an article of clothing, a wallet, a briefcase, a bag, a shoe, or any other item that a user may typically carry or wear. In some embodiments, key 110 may be inserted inside a user's body (e.g., surgically inserted under a user's skin).

Host device 120 and other device 130 may include transceiver circuitry for wirelessly coupling to key 110. In some embodiments, host device 120 or other device 130 may require the user to initially set up communications links 140 and 142 with key 110. For example, the user may pair key 110 with host device 120 and other device 130.

Host device 120 and other device 130 may be any device or system that may be moved from at least a first position or state to a second position or state. In some embodiments, host device 120 and other device 130 may be any device or system with which a user may access personalized settings or information. For example, host device 120 or other device 130 may include a computer, a workstation, a cellular telephone, a mobile communications device, a personal media device, a set-top box, a television system, or any other suitable electronic device.

In some embodiments, host device 120 and other device 130 may be any device or system that can be moved to at least two different positions or states (e.g., on/off or open/closed). For example, host device 120 or other device 130 may include a light or light switch, curtains or shades, an elevator, a conveyer belt, a motorized device, or any other device or system that may be moved from at least a first to a second position or state. As another example, host device 120 or other device 130 may include an automobile or other vehicle, a door or window (e.g. with a lock), a gate or turnstile, a garage door, or any other device or system for which a key or pass is required.

Figure 2:
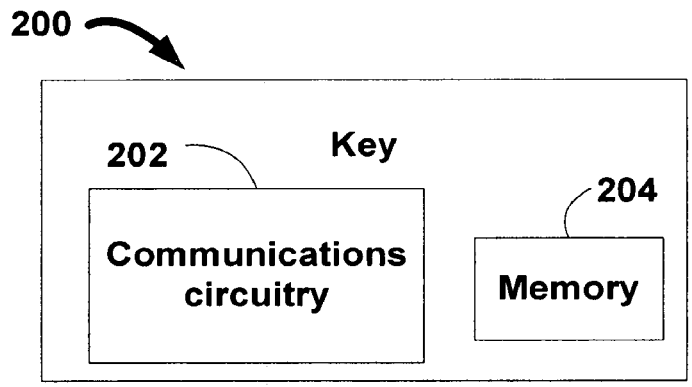
FIG. 2 is a simplified block diagram of an illustrative key in accordance with one embodiment of the invention.

FIG. 2 is a simplified block diagram of an illustrative key in accordance with one embodiment of the invention. Key 200 may include communications circuitry 202 and memory 204. Communications circuitry 202, or sometimes referred to herein as personal area network circuitry or short-range communications circuitry, may enable key 200 to function as a host for a personal area network. That is, communications circuitry 202 may enable key 200 to wirelessly communicate with one or more devices using a short range communications protocol. For example, communications circuitry 202 may support Wi-Fi communications (e.g., one of the 802.11 standards), Bluetooth, Nordic, high frequency systems (e.g., 900 MHz, 2.4 GHz, and 5.6 GHz communication systems), short-range radio circuitry (e.g., walkie-talkie type circuitry), infrared, and other relatively localized wireless communication protocols.

Using one or more supported communication protocols, communications circuitry 202 may be configured to create a network for transferring data to and from other devices. The data transferred from key 200 may include, for example, authentication information, identification information, a command or instruction to perform an operation with a host device, an identifier for a user profile or for user preferences, files or other data, or any combination thereof. Communications circuitry 202 may be configured to provide host device-specific data, for example in response to identifying the host device to which key 200 communicates or is "paired" in the network.

Memory 204 may include one or more different types of memory which may be used for performing device functions. For example, memory 204 may include cache, Flash, ROM, and/or RAM. Memory may be specifically dedicated to storing firmware Memory 204 may be provided for storing firmware for device applications (e.g., operating system, user interface functions, and processor functions). Memory 204 may store data for pairing itself or communicating with one or more devices (e.g., a host device) using a communications protocol supported by communications circuitry 202.

In some embodiments, memory 204 may be configured to store data transmitted by communications circuitry 202 (e.g., authentication information, identification information, an instruction to perform an operation with a host device, an identifier for a user profile or for user preferences, or user profile or user preference data) to a host device to which key 200 is paired. In embodiments in which memory 204 stores a user profile or user preference information, key 200 may be operative to transmit the user profile or user preference information to a host device when the host device is within the network of the key. In some embodiments, memory 204 may instead or in addition store files or other data used by the user (e.g., files stored on the user's desktop, or recent files accessed by the user), and transfer the files or other data when a host device is within the network of the key. With this approach, each user may access a host device with their preferences without requiring the host device to connect to a server to identify and load the proper preferences. This may allow a user to access personal information using a host device even when the host device is not connected to a server (e.g., when the host device is offline, for example a laptop computer in an airplane or in a tunnel).

In some embodiments, memory 204 may store a communications protocol for pairing key 200 with host devices. Memory 204 may host a database of the host devices to which key 200 was paired, for example, using a serial number or other identifier for the host device. Memory 204 may store instructions that key 200 can transmit to cause each host device to perform one or more operations. For example, if the host device is a computer, memory 204 may store authentication information for key 200 to automatically log the user into the computer. As another example, if the host device is an elevator, memory 204 may store an instruction to call an elevator to go to a particular floor. As still another example, if the host device is a vehicle, memory 204 may store an instruction to unlock the vehicle and to start the vehicle's engine, radio, navigation system, other vehicle function, or any combination thereof. As a final example, if the host device is a light or door, memory 204 may store an instruction to turn the light on, or open or unlock the door.

Any number of approaches may be used to store the required information in memory 204. In some embodiments, when key 200 is first paired with a host device, the host device may provide the information to key 200 for storing in memory 204. For example, the host device may automatically provide the information when the host device and key 200 are paired. As another example, the user of the host device may direct the host device to provide particular information to key 200. This approach may be used, for example, to allow the user to select the operation or operations that key 200 will direct a particular host device to perform (e.g., the key may cause an automobile to turn on the media system, activate the navigation system, or turn on the engine).

In some embodiments, the user may set up key 200 to perform particular operations. For example, key 200 may include a display and user interface allowing the user to set up the operation of the key. As another example, key 200 may be coupled to a base or docking station through which the user may set up key 200. The base may be a standalone device having a display and a user interface, a host device with a display and a user interface, or any other suitable device by which a user may set up key 200. In some embodiments, the user may wirelessly set up one or more keys using the base.

In some embodiments, key 200 may also include a power supply, a user interface and a display. Key 200 may also include a processor distinct from communications circuitry 202. The processor can control the operation of some or all of the functions and components included in key 200. For example, the processor may drive the display and process inputs received from the user interface. In some embodiments, key 200 may include some form of a limited interface such as, for example, an ON/OFF switch. In some embodiments, key 200 may include an interface that the user must select to transmit data from key 200 (e.g., a transmit or broadcast switch).

The user interface may allow a user to interact with key 200. For example, the user input device can take a variety of forms, such as a button, keypad, dial, a click wheel, or a touch screen. The user interface may include a multi-touch screen such as that described in U.S. Pat. No. 6,323,846, which is incorporated by reference herein in its entirety. The user interface may emulate a rotary phone or a multi-button keypad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Key 200 may be any suitable device that includes at least communications circuitry 202 and memory 204. Because key 200 may require so few elements, and these elements may be very small in size, key 200 may be a very small device. For example, key 200 may include, or be integrated in, a key fob, a card (e.g., a credit card shaped device), a portable drive (e.g., a flash drive), a widget (e.g., a coin-sized object), or any other suitable device or object that may be unobtrusively carried in a user's pocket, purse or bag. In some embodiments, key 200 may include a clip or other connecting mechanism for attaching key 200 to an object that the user typically carries. For example, key 200 may be clipped or attached to a user's wallet, cellular telephone, personal media device (e.g., an iPod), wired headset, wireless headset, watch, bag, belt, article of clothing, or any other suitable object. In some embodiments, key 200 may be inserted inside a user (e.g., surgically inserted under a user's skin).

Figure 3:
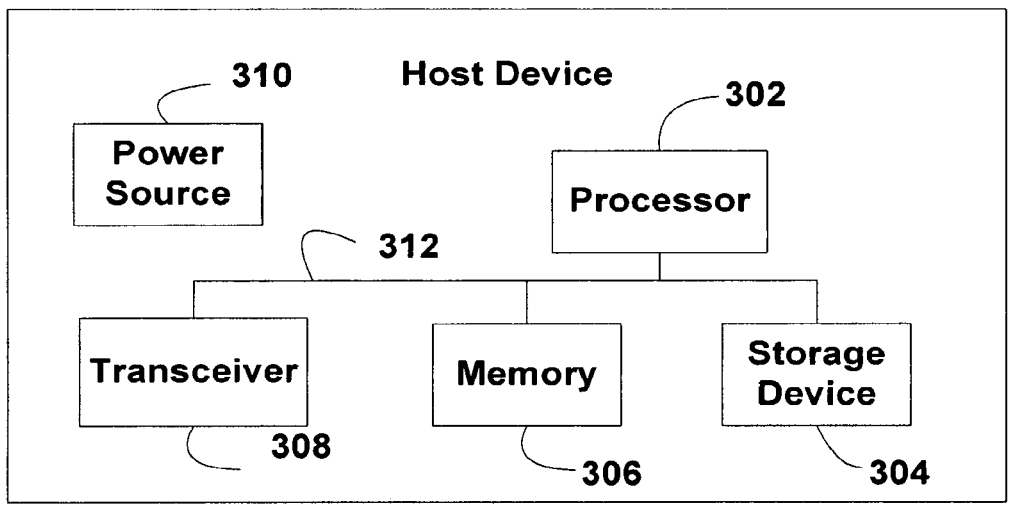
FIG. 3 is a simplified block diagram of a host device or other device in accordance with one embodiment of the invention.

In some embodiments, key 200 or its functionality may be incorporated in an electronic device. For example, key 200 may be incorporated in a cellular telephone, a mobile communications device, a pocket-sized personal computer (e.g., an iPAQ or a Palm Pilot) a personal media device (e.g., an iPod), a camera, a video recorder, a computer (e.g., a laptop computer), a key (e.g., car keys), a remote controller, or any other suitable electronic or personal device. Key 200, or the device in which key 200 or its functionality is incorporated may be sized to fit relatively easily into a pocket or hand of the user, and may be taken practically anywhere the user travels FIG. 3 is a simplified block diagram of a host device or other device in accordance with one embodiment of the invention. Host device 300 may include processor 302, storage device 304, memory 306, transceiver 308, power supply 310 and bus 312. Processor 302 can control the operation of the functions and components of device 300.

Storage device 304 may include one or more storage mediums, including for example, a hard-drive, flash memory, permanent memory such as ROM, semi-permanent memory such as RAM, or cache. Storage device 304 may store media (e.g., music and video files), software (e.g., for implementing functions on device 300), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 300 to establish a wireless connection), subscription information (e.g., information that keeps tracks of podcasts or television shows or other media a user subscribes to), contacts information (e.g., telephone numbers and email address), calendar information, and any other suitable data.

In some embodiments, storage device 304 may store authentication information for a user to enter prior to accessing the functionality of the device. For example, storage device 304 may store username and password combinations, or algorithms and keys for authenticating a string entered by the user (e.g., using a RSA algorithm). Storage device 304 may store data for pairing itself or communicating with one or more devices (e.g., key 200, FIG. 2) using a short-range communications protocol.

Memory 306 may include one or more different types of memory which may be used for performing device functions. For example, memory 306 may include cache, Flash, ROM, and/or RAM. Memory may be specifically dedicated to storing firmware. For example, memory 306 may be provided for storing firmware for device applications (e.g., operating system, user interface functions, and processor functions).

Transceiver 308 may enable device 300 to wirelessly communicate with one or more keys (e.g., key 200. FIG. 2) using a short range communications protocol. For example, transceiver 308 may support Wi-Fi communications (e.g., one of the 802.11 standards), Bluetooth, Nordic, high frequency systems (e.g., 900 MHz, 2.4 GHz, and 5.6 GHz communication systems), infrared, short-range radio circuitry (e.g., walkie-talkie type circuitry), and other relatively short-range wireless communication protocols.

Bus 312 may provide a data transfer path for transferring data to, from, or between processor 302, storage device 304, memory 306 and transceiver 308. In some embodiments, a coder/decoder (CODEC) may be included to convert digital audio signals into an analog signal, which may be provided to an output port (not shown).

Power supply 310 may provide power to the components of device 300. In some embodiments, power supply 310 may be coupled to a power grid (e.g., a personal computer). In some embodiments, power supply 310 may include one or more batteries for providing power in a portable device. As another example, power supply 310 may be configured to generate power in a portable device from a natural source (e.g., solar power using solar cells).

In some embodiments, device 300 may include a 15 display and a user interface. The display and user interface may include some or all of the features discussed above in connection with the display and user interface of key 200.

In some embodiments, device 300 may be an electronic device in which a user may provide identifier information to receive authorization to access the device, or to access or load the user's personal information. Device 300 may include, for example, a computer, a cellular telephone, a mobile communications device, a personal media device, a set-top box, a television system, or any other suitable electronic device.

Figure 4:
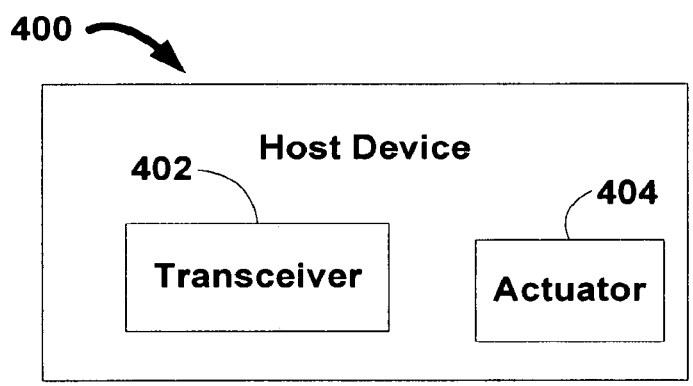
FIG. 4 is a block diagram of another host device in accordance with one embodiment of the invention.

FIG. 4 is a simplified block diagram of another host device in accordance with one embodiment of the invention. Host device 400 includes transceiver 402 and actuator 404. Transceiver 402 may enable device 400 to wirelessly communicate with one or more keys (e.g., key 200, FIG. 2) using a short range communications protocol. Transceiver 402 may include one or more of the features described above in connection with transceiver 308 (FIG. 3).

Actuator 404 may be any suitable component operative to move device 400 from a first position or state to a second position or state. For example, actuator 404 may include a motor that is configured to move an element within device 400. As another example, actuator 404 may include a motor that is configured to move device 400. In some embodiments, actuator 404 may include a switch, for example for turning a device or a function on or off (e.g., a light switch, a door lock, or an air conditioner or heater). In some embodiments, actuator 404 may be processor for performing operations in response to instructions from firmware or software. For example, actuator 404 may be a processor that performs a particular function or operation under the control of a software program. The function or operation may include, for example, authenticating a user to the system (e.g., logging in the user), loading a user's settings (e.g., a user's preference profile), dialing a telephone number, opening a program (e.g., opening a user's e-mail software), activating a peripheral, activating a system coupled to the device (e.g., starting an automobile's engine), or any other suitable operation.

The key according to embodiments of this invention may be integrated in a number of devices or objects, several of which are described in more detail below. As discussed in connection with FIGS. 1 and 2, a key may be in communication with a host device when the host device is within communications network 112 (FIG. 1). Specific examples of where a key may be placed to create a personal area network are shown in FIG. 5.

Figure 5:
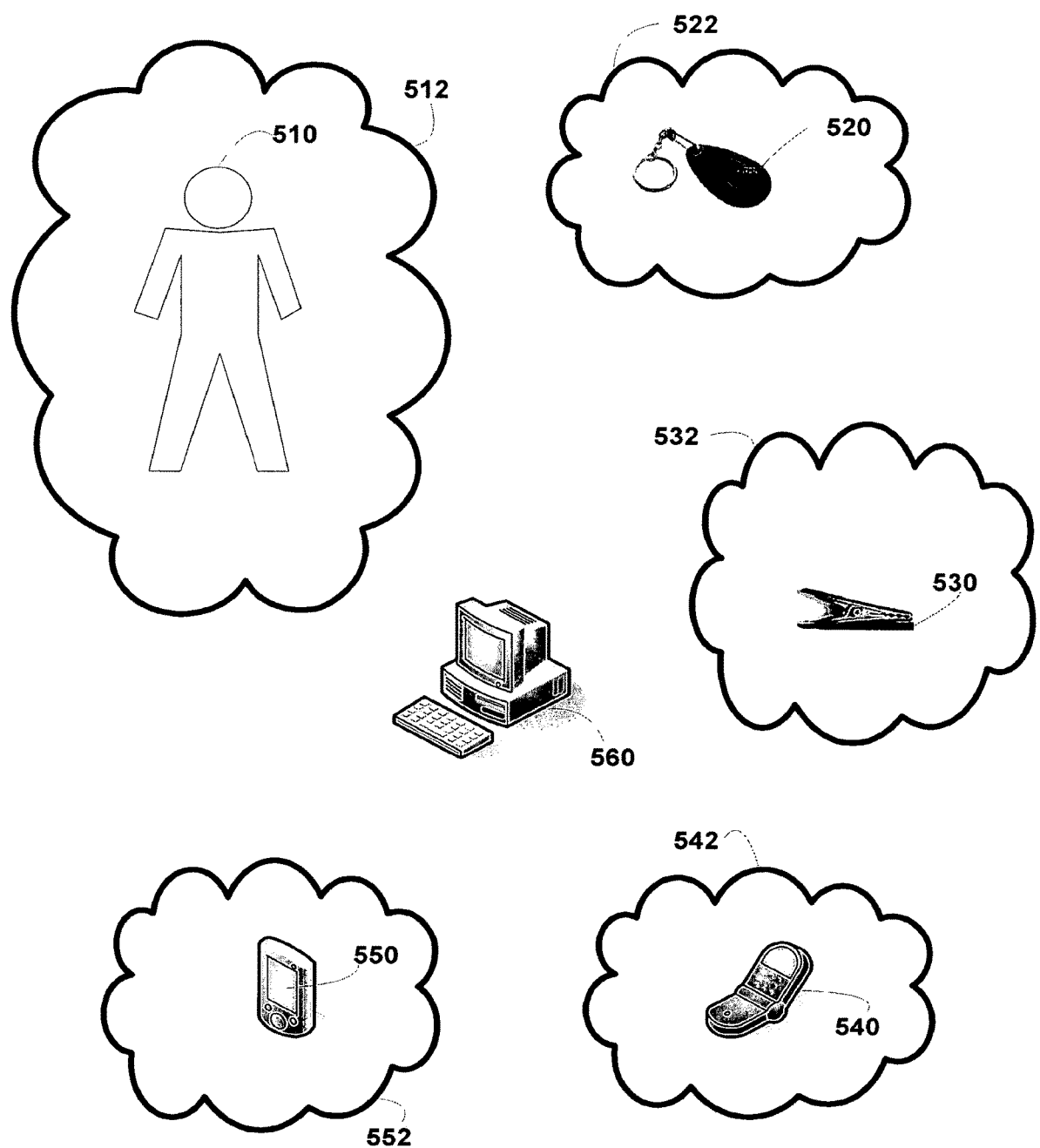
FIG. 5 shows specific examples of where a key may be placed to create a personal area network in accordance with one embodiment of the present invention.

FIG. 5 shows person 510, key fob 520, clip 530, mobile telephone 540, and personal media device 550, each of which may harbor a key that creates personal area networks 512, 522, 532, 542 and 552, respectively. When the key of any of these locations comes in proximity of a host device, such that the host device is within the personal area network of the key, the host device may perform an operation. In the example of FIG. 5, host device 560 is a computer into which the user associated with the key may be automatically logged in when host device 560 is within the personal area network of the key. In some embodiments, host device 560 may log out the user or lock the computer when host device 560 is no longer within the personal area network of the key.

By virtue of the presence of a key, a personal area network may exist about person 510. In this example, the person may keep the key his or her pocket(s), or alternatively, the key may be kept substantially near the person such as an accessory item (e.g., handbag, backpack, or purse). In some embodiments, the key may be integrated with clothing or an accessory item, providing functional fashion having device operation capabilities. In some embodiments, the key may be embedded under a user's skin (e.g., surgically implanted).

As defined herein, integration of a key refers to placing the key within or attached to an item, or incorporating the key into the item such that it appears to be part of the item. In some embodiments, a key may be integrated in any of key fob 520, object with clip 530 (e.g., a clip configured to be attached to an article of clothing or accessory), mobile telephone 540, and personal media device 550 using any suitable approach.

The host device or other devices according to embodiments of this invention may be configured to perform any suitable operation when the key is placed in proximity of the host device such that the personal area network of the key encloses the host device. As discussed in FIGS. 3 and 4, a host device may perform any suitable operation in response to receiving a signal from the key. Specific examples of host devices and the operations performed in response to entering the network created by are shown in FIG. 6.

Figure 6:
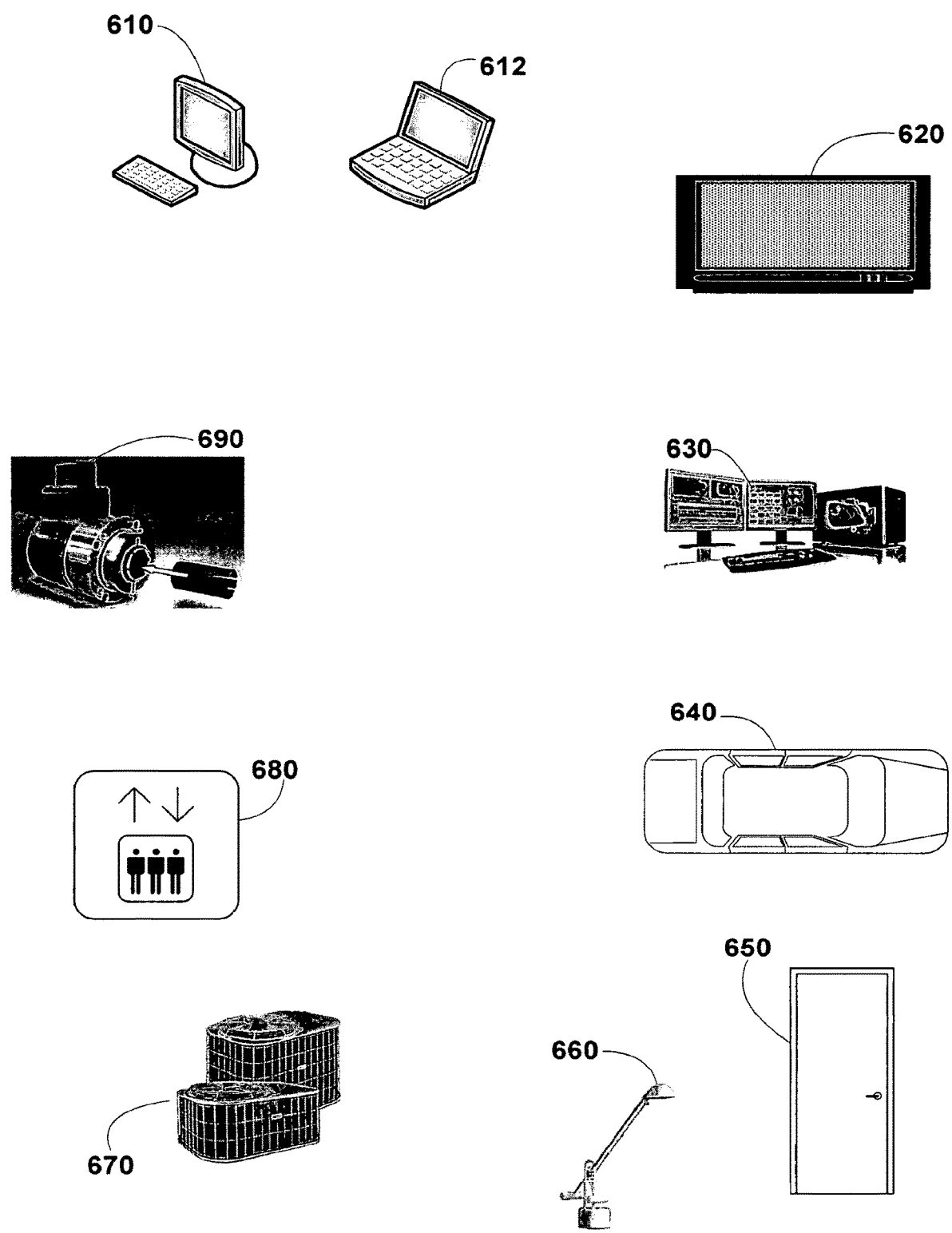
FIG. 6 shows specific examples of host devices in accordance with one embodiment of the present invention.

FIG. 6 shows computer 610, laptop 612, television system 620, multimedia system 630, automobile 640, door 650, lamp 660, heating and/or air conditioning system 670, elevator 680, and motor 690. The devices and systems of FIG. 6 may be configured to perform various operations when a key is placed in proximity of the device or system such that the device or system is within the network created by the key. For example, computer 610 and laptop 612 may be configured to automatically log the user associated with the key into the computer system. As another example, computer 610 and laptop 612 may automatically load a user's profile or preferences when the key is brought in proximity of the system. In some embodiments, the key alone may be sufficient to perform the operation with computer 610 or laptop 612. In some embodiments, however, the user may be required to enter private information in addition to having the key present to perform an operation (e.g., a password for a more secure login to the computer) In some embodiments (e.g., if the key has a user interface), the user may provide login data to the key for transmission to computer 110 or 112.

Television system 620 may be configured to automatically load a user's profile or preferences when a key associated with the user is brought in proximity of system 620. As another example, system 620 may be configured to automatically log in the user associated with the key (e.g., to automatically load the user's pin for ordering PPV programs and on-demand content, and setting-up recordings). Similarly, media system 630 may be configured to automatically load the user profile or preferences of the user associated with the key, or login the user associated with the key (e.g., load the user's music preferences or load the user's playlists).

Automobile 640 may be configured to perform any of a number of operations when a key is brought in proximity of the automobile. For example, automobile 640 may unlock one or more of its doors when the key is brought in proximity of the automobile. As another example, automobile 640 may automatically start its engine. As still another example, automobile 640 may automatically turn on the heating or air conditioning system of the automobile. As another example, automobile 640 may automatically activate a navigation system (e.g., a GPS system) or a media system. In some embodiments (e.g., if the key has a user interface), the user may select with the key one or more particular operations for automobile 640 to perform, and direct the key to transmit the user's selections to the automobile.

Door 650 may be any suitable door or gate for preventing ingress and egress. For example, door 650 may be the door to a home, office, or other building. As another example, door 650 may be a garage door or other door or gate for preventing vehicles from passing. As still another example, door 650 may be a gate or a turnstile (e.g., for accessing public transportation, a stadium, or an office building). When a key is brought in proximity of door 650, the door may be configured to unlock or lock automatically. For example, a door may unlock when a key is brought in proximity of the door, and lock as soon as the door is no longer within the network created by the key. As another example, the door may switch from locked to unlocked and back each time the door enters the network created by the key. In some embodiments, door 650 may automatically open or close when a key is brought in proximity to door 650 (e.g., automatically open a door for a handicapped person in the presence of the key). In some embodiments, the user may enter an input on the key or door, in addition to bringing the key in proximity of door 650.

Lamp 660 may be any suitable light source for a user. For example, lamp 660 may be a floor, wall, or ceiling lamp. As another example, lamp 660 may be curtains or shades that may be opened to allow light to pass. Lamp 660 may be configured to be turned on or off when a key is brought in proximity of the lamp. For example, as long as lamp 660 is within the network created by the key, lamp 660 may be turned on. As another example, lamp 660 may be configured to be turned on a particular level (e.g., dim lights) when the key is brought in proximity of lamp 660. In some embodiments (e.g., if the key has a user interface), the user may select with the key whether to turn lamp 660 on or off, or select the intensity for the lamp, and direct the key to transmit the selection to lamp 660.

Heating and/or air conditioning system 670 may be any suitable system for heating or cooling air, for example in a building or vehicle. Heating and/or air conditioning system 670 may be configured to discharge air at a particular temperature when the key is brought in proximity of heating and/or air conditioning system 670. In some embodiments, the key may direct heating and/or air conditioning system 670 to bring the temperature to a specific temperature (e.g., the key may transmit data that specifies a temperature). In some embodiments (e.g., if the key has a user interface), the user may select with the key a temperature, fan speed, or other setting, and direct the key to transmit the selection to system 670.

Elevator 680 may be any suitable elevator. When a key is brought in proximity of elevator 680, for example on a floor that is served by elevator 680, the elevator may automatically be called to the floor of the key. In some embodiments, the key may transmit floor request information for the elevator to automatically select the floor to which the elevator will move. For example, the key may transmit data for two floors, the exit floor and the destination floor (e.g., an office floor or an apartment floor). When the elevator receives the transmission from the key, it may first determine the floor from which the key transmitted. If the floor is one of the ground floor and the destination floor, the elevator may automatically select the other floor. If the floor is neither the ground floor nor the destination floor, the elevator may select both and prompt the user to confirm the selection of one or the other, or the elevator may not select any floor. In some embodiments (e.g., if the key has a user interface), the user may select a floor with the key, and direct the key to transmit the selection to the elevator.

Motor 690 may be any suitable motor, engine or actuator that is present in any device or system. For example, motor 690 may be part of a vehicle, a security system, or any other suitable device or system. When a key is brought in proximity of motor 690, motor 690 may be configured to turn on or off, rotate or actuate at a specific speed in a specific direction, or accelerate or decelerate at a specific rate. In some embodiments (e.g., if the key has a user interface), the user may select with the key a particular action for motor 690 to perform, and direct the key to transmit the selected action to motor 690.

In some embodiments, a plurality of keys may create personal area networks in which a host device is present. For example, a classroom may include many students, each with their own laptop computers, and each with their own key. Each student's key may create a personal area network that includes all of the laptop computers present in the classroom. Each laptop, and more generally speaking each host device, may determine which key to communicate with in any suitable manner. In some embodiments, the host device may identify the key that transmits a signal exceeding a threshold signal strength, and communicate with the identified key. In some embodiments, the host device may identify the key that transmits a signal with the highest signal strength (e.g., the closest key to the host device). The measure of signal strength may be absolute (e.g., the key with the highest actual data transfer rate), or may be relative to each key's capabilities (e.g., the key with the highest ratio of actual data transfer rate to maximum data transfer rate). In some embodiments, the host device may prompt the user to select a particular key (e.g., provide a selectable list of available keys in a pop-up menu). In some embodiments,
30 the host device may automatically select the key that has previously communicated with the host device (e.g., the laptop computer communicates in class with the same key that the laptop computer communicates with in the user's dorm room).

A host device may be configured to perform an operation when it is within the personal area network created by a key using a number of different approaches. In some embodiments, the key may transmit instructions to perform one or more specific operations to the host device. For example, once the key has been paired with the host device (e.g., authenticated to the host device), the key may direct the host device to perform an operation. In some embodiments, the host device instead may itself identify the operation to perform when it is within the personal area network of a key. For example, the host device may identify the key, and retrieve from memory one or more operations that are associated with the identified key. Both of these approaches will be discussed in more detail in the following flow charts. In addition, the following flow charts refer to a number of processes that can be performed by keys and host devices in accordance with some embodiments of the invention.

Figure 7:
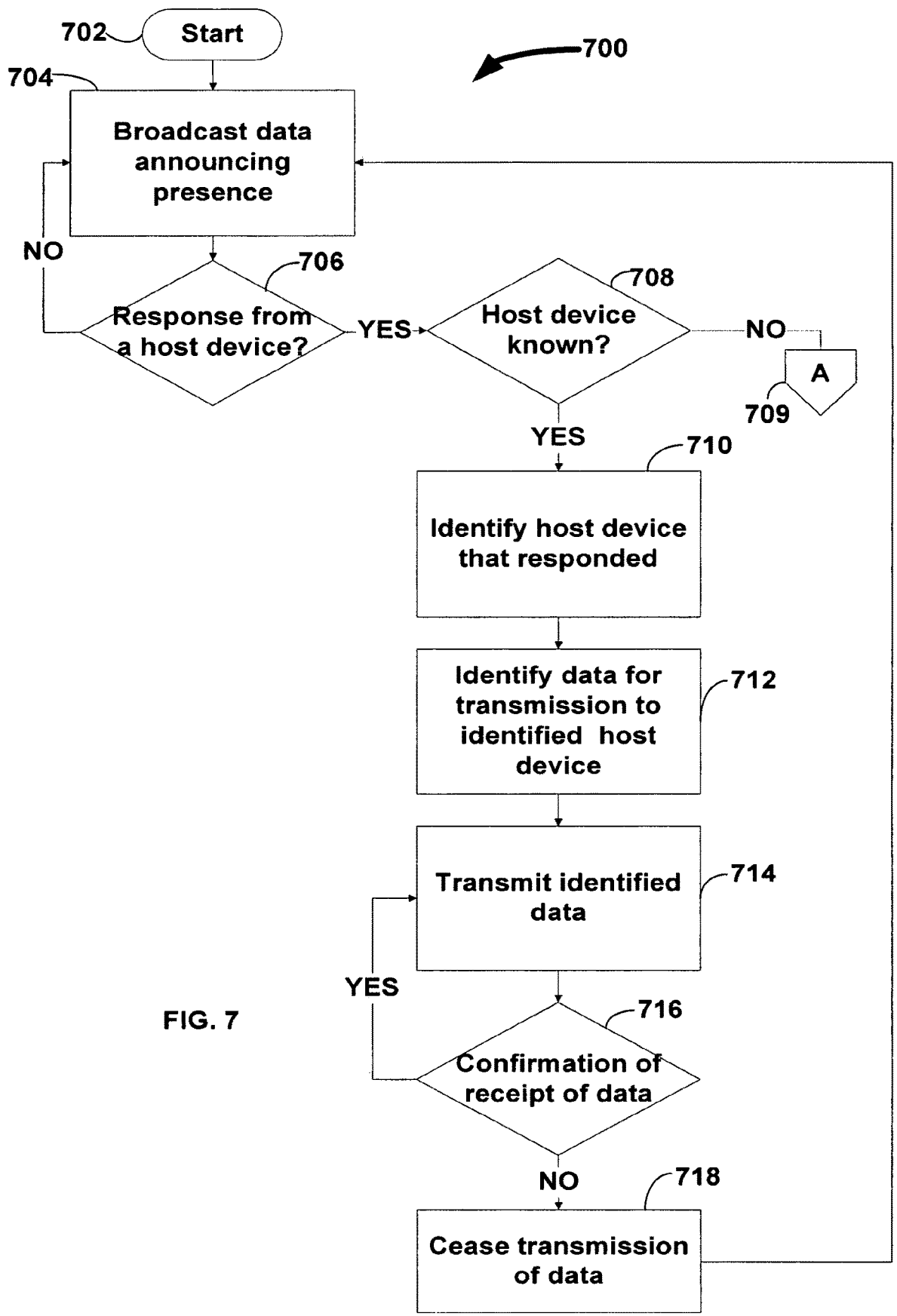
FIG. 7 shows a flowchart of an illustrative process for transmitting data with a key to a host device in accordance with one embodiment of the invention.

FIG. 7 shows a flowchart of an illustrative process for transmitting data with a key to a host device in accordance with one embodiment of the invention. Process 700 begins at step 702. At step 704, the key broadcasts data, for example to notify other devices of the personal area network created by the key. For example, communications circuitry 202 of key 200 (FIG. 2) may transmit or broadcast identification information in the personal area network created by communications circuitry 202.

In some embodiments, the key may perform only this step. For example, this approach may be used in embodiments where the host device retrieves from memory, based on the identification information, the operation to perform. In such an embodiment, process 700 would then terminate. In some embodiments, however, the key may perform additional steps. These steps will be described below as part of process 700. It will be understood, however, that in some embodiments, process 700 may terminate after step 704.

At step 706, the key determines whether a host device is present within the personal area network. For example, communications circuitry 202 may determine whether any transmissions are received from a host device. If the key determines that no host device is present within the personal area network, process 700 returns to step 704 and continues to broadcast data.

If, at step 706, the key instead determines that a host device is present within the personal area network, process 700 may move to step 708. In some embodiments, process 700 may also move to step 704, and continue to broadcast data for other host devices within the personal area network. At step 708, the key determines whether the host device that responded at step 706 is known. For example, the key may determine whether identifier information provided by the host device matches identifier information stored in memory 204 (FIG. 2). If the key determines that the host device is unknown, process 700 moves to step 709, which calls process 800 (FIG. 8), discussed in more detail below.

If, at step 708, the key instead determines that the host device is known, process 700 moves to step 710. At step 710, the key identifies the host device that responded. For example, communications circuitry 202 may compare identification information provided by the host device with the identification information of known host devices stored in memory 204.

At step 712, the key identifies the data to transmit to the identified host device. For example, communications circuitry 202 may retrieve from memory 204 the data for transmission that is associated with the identified host device (e.g., data stored in a database field with the host device identifier). The identified data may include authentication information (e.g., login information), instructions to perform an operation (e.g., instructions to start an engine), parameters for performing an operation (e.g., an elevator floor), a user's working documents (e.g., files), or any other suitable data.

At step 714, the key transmits the data identified at step 712. For example, communications circuitry 202 may transmit the identified data to the host device using any suitable communications protocol. In some embodiments, the data transmission may be encrypted. At step 716, the key determines whether the host device confirmed receipt of the transmitted data. For example, communications circuitry 202 may request a checksum or other data from host device confirming that the host device in fact received the transmitted data. If the key determines that the host device did not confirm receipt of the transmitted data, process 700 moves back to step 714 and transmits the identified data again.

If, at step 716, the key instead determines that the host device received the transmitted data, process 700 moves to step 718. At step 718, the key ceases to transmit the identified data. For example, communications circuitry 202 may halt transmissions of authentication information. In some embodiments, the key may re-transmit the identified data at different intervals (e.g., if the host device requests a new transmission of authentication data). Process 700 then returns to step 704, where communications circuitry 202 broadcasts data identifying the key in the personal area network.

Figure 8:
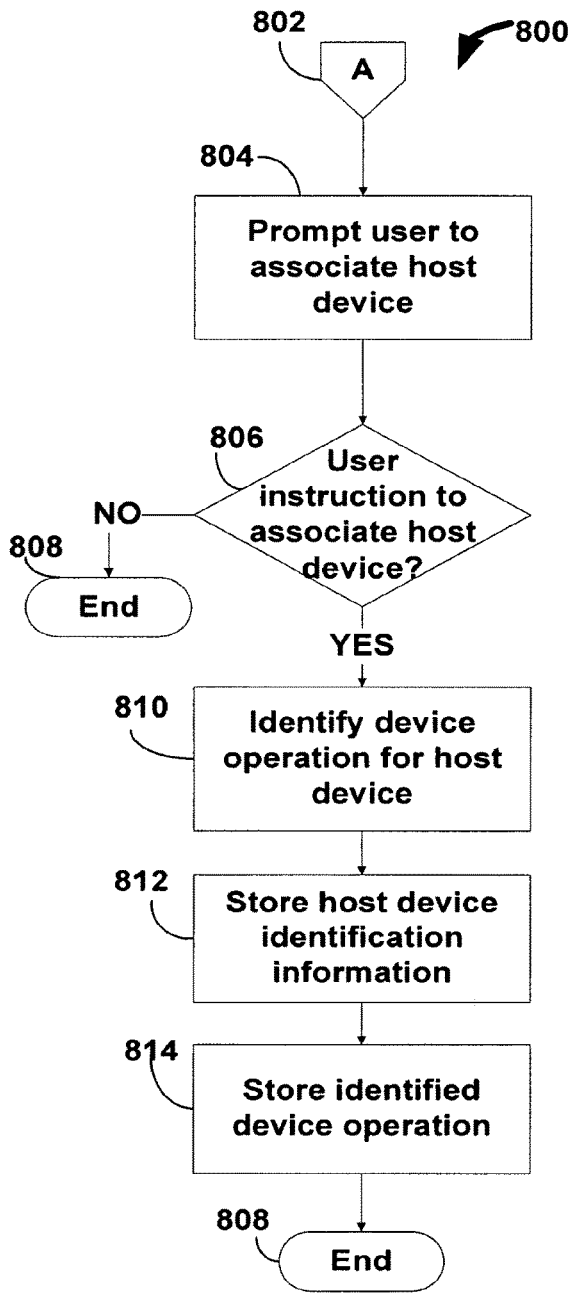
FIG. 8 shows a flow chart of an illustrative process for associating a host device with a key in accordance with one embodiment of the invention.

FIG. 8 shows a flow chart of an illustrative process for associating a host device with a key in accordance with one embodiment of the invention. Process 800 begins at step 802. In some embodiments, step 802 may correspond to step 709 of process 700 (FIG. 7). At step 804, the key prompts the user to associate the identified host device with the key. For example, a display on the key may display a prompt asking the user if the user would like to pair the identified host device with the key. The display may indicate that the user may enter a selection using a user interface of the key.

At step 806, the key determines whether the user provided an instruction to associate the host device with the key. For example, a processor in the key may determine whether the user provided an input using the user interface. In addition, the processor may determine whether the input provided by the user was YES or NO. If the key determines that the user provided no instruction to associate the device with the key, or an instruction not to associate the device with the key, process 800 moves to step 808 and ends.

If, at step 806, the key instead determines that the user provided an instruction to associate the device with the key, process 800 moves to step 810. At step 810, the key identifies a device operation to be performed by the host device. For example, the key may select a default or standard operation that is performed by the host device (e.g., turning a light on or off). As another example, the user may enter a device operation using the user interface of the key. In some embodiments, the display may provide a confirmation of the selected device operation.

At step 812, the key stores host device identification information. For example, a host device identifier may be stored in memory 204 (FIG. 2). At step 814, the key stores the identified device operation. For example, the device operation may be stored in memory 204 (e.g., associated with the host device identifier in a suitable data structure). Process 800 then ends at step 808.

Figure 9:
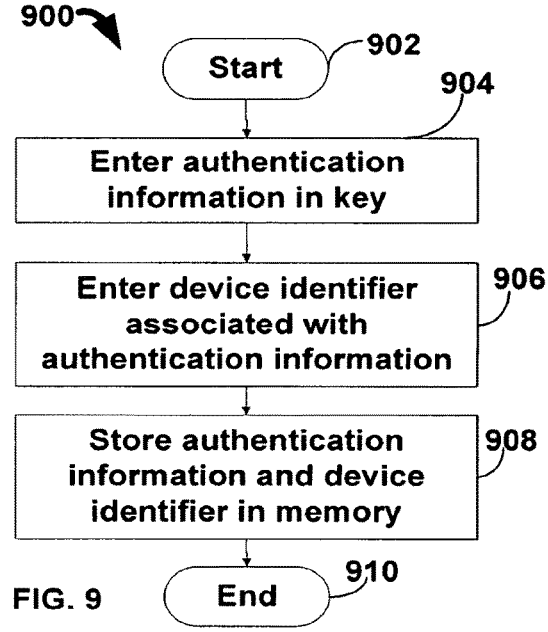
FIG. 9 shows a flow chart of an illustrative process for entering authentication information to be transmitted to a host device in accordance with one embodiment of the invention.

FIG. 9 shows a flow chart of an illustrative process for entering authentication information to be 30 transmitted to a host device in accordance with one embodiment of the invention. This process may be used to initially load the user's authentication information in the key for transmission to a host device. In some embodiments, the user may perform this process only once, when the key is first set up, and the key subsequently automatically provides the required authentication information to devices in the key's personal area network. Process 900 starts at step 902. At step 904, the user enters authentication information for transmission to a host device. For example, the user may enter a username and password combination. As another example, the user may enter a unique identifier. As still another example, the user may enter a seed that is used to generate an identifier using a mathematical algorithm (e.g., an RSA algorithm).

At step 906, the user enters a device identifier to be associated with the authentication information. For example, the user may enter a unique identifier for a device. As another example, the user may enter an IP address or other network address for the device. As still another example, the user may select the device from a menu.

The user may enter data in the key using any suitable approach. For example, the user may enter data using an user interface of the key. As another example, the user may enter data using a base having an user interface, and couple the key to the base to transfer the data to the key. In some embodiments, the user may view inputs using a display integrated in the key or in the base.

At step 908, the key stores the authentication information and device identifier. For example, the key may store the authentication information and device identifier in memory 204 (FIG. 2). Process 900 then ends at step 910.

In the preceding discussion, process 900 was described in the context of entering authentication information in the key for transmission to a host device. It will be understood, however, that that any suitable data, for example a device operation, may be entered in the key for transmission to a host device using process 900.

Figure 10:
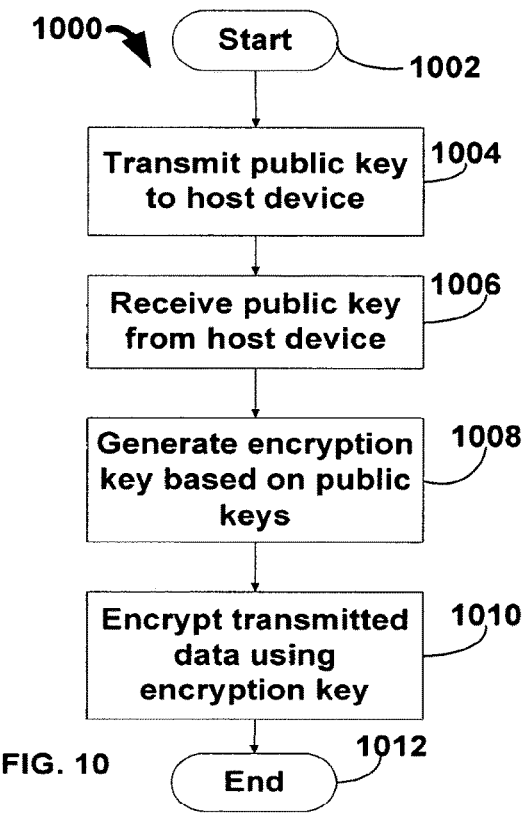
FIG. 10 a shows a flow chart of an illustrative process for creating a secure communications link between a key and a host device in accordance with one embodiment of the invention.

FIG. 10 shows a flow chart of an illustrative process for creating a secure communications link between a key and a host device in accordance with one embodiment of the invention. Process 1000 starts at step 1002. At step 1004, the key transmits its public key to the host device. For example, communications circuitry 202 (FIG. 2) may retrieve the private key from memory 204 (FIG. 2) for transmission to the host device. At step 1006, the key receives a public key from the host device. For example, communications circuitry 202 may receive a transmission of the public key from the host device. At step 1008, the key generates an encryption key based on the public key received from the host device and on the private key of the key. For example, a processor in the key may perform an operation on the public key of step 1006 and on the private key of the key to generate an encryption key (e.g., using an RSA algorithm).

At step 1010, the key encrypts its transmissions using the encryption key generated at step 1008. For example, communications circuitry 202 may transmit encrypted data to the host device. Process 1000 then ends at step 1012. Although process 1000 was described as using private and public keys (e.g., used for example in the RSA algorithm), any other approach may be used to generate an encryption key to encrypt data transmitted from the key to the host device.

Figure 11:
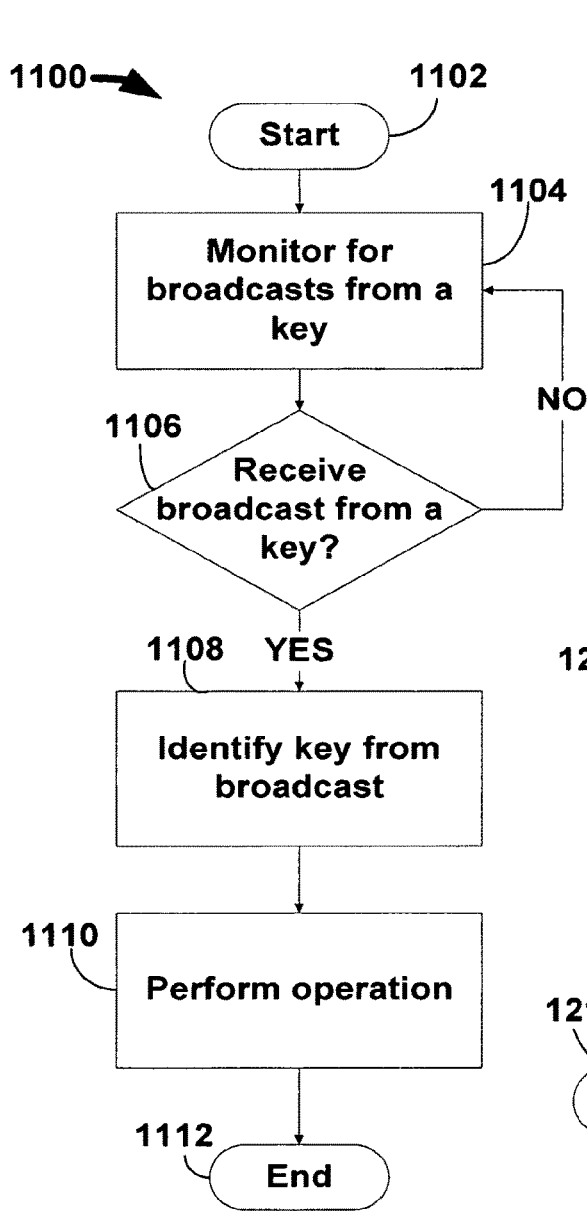
FIG. 11 shows a flow chart of an illustrative process for performing an operation with a host device when a key is placed in proximity of the host device in accordance with one embodiment of the invention.

FIG. 11 shows a flow chart of an illustrative process for performing an operation with a host device when a key is placed in proximity of the host device in accordance with one embodiment of the invention. Process 1100 begins at step 1102. At step 1104, the host device monitors for broadcasts from a key. For example, transceiver 308 (FIG.

3) or transceiver 402 (FIG. 4) may monitor incoming communications to identify broadcasts from keys. At step 1106, the host device determines whether a broadcast from a key has been received. For example, transceiver 308 may determine whether an incoming transmission is from a key (e.g., whether a transmission uses a particular protocol, or has specific identifying information). If the host device determines that no broadcast has been received from a key, process 1100 returns to step 1104 and continues to monitor incoming communications.

If, at step 1106, the host device determines that a broadcast from a key has been received, process 1100 moves to step 1108. At step 1108, the host device identifies the key from the broadcast data. For example, processor 302 (FIG. 3) may compare the data provided in the broadcast with identification data for various keys stored in storage device 304 (FIG. 3) or memory 306 (FIG. 3). Processor 302 may determine, for example, that a key identifier transmitted in the broadcast data is the same as that for a known key stored in storage device 304 or memory 306. In some embodiments, if transmissions from many keys are received, processor 302 may identify and select any particular key (e.g., the key with the strongest signal strength, or a key that has been previously used with host device 300, FIG. 3).

At step 1110, the host device performs an operation in response to identifying the key. For example, transceiver 308 may receive instructions from the key to perform a particular operation (e.g., log a user into the host device). As another example, processor 302 may retrieve from storage 304 or memory 306 an operation associated with the identified key, and perform the retrieved operation. Process 1100 then ends at step 1112.

Figure 12:
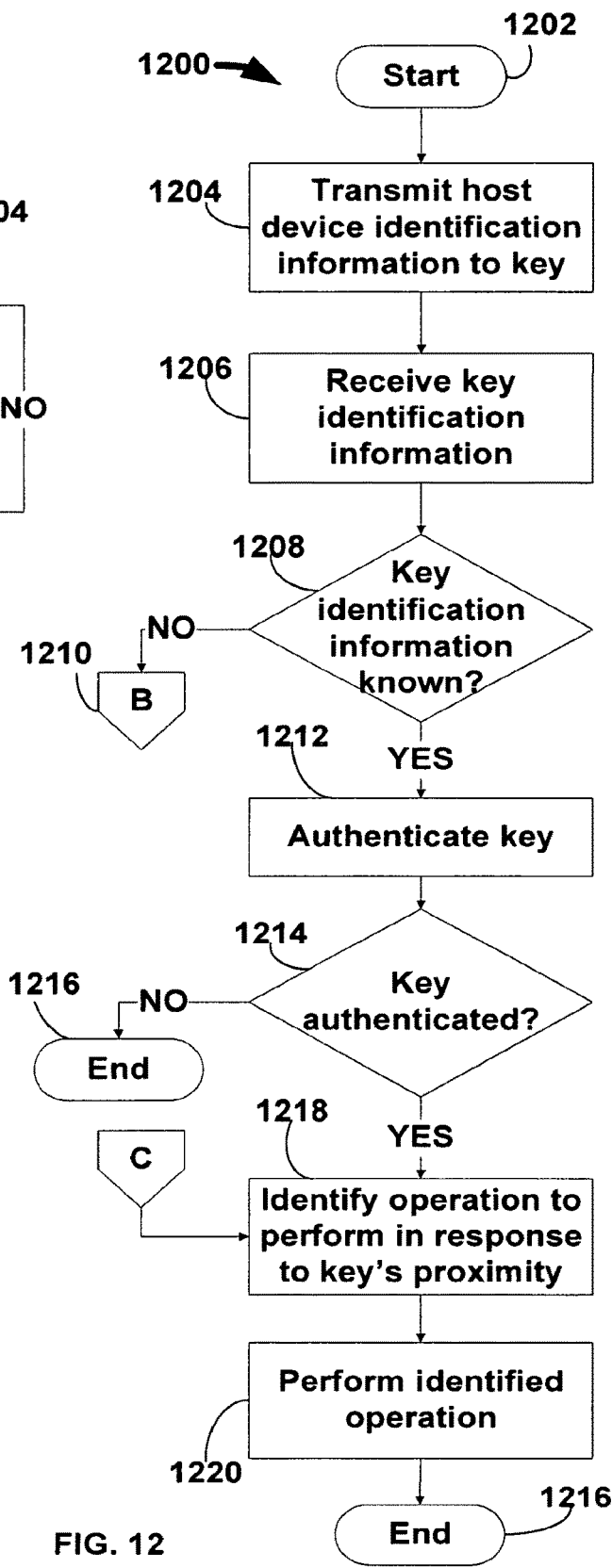
FIG. 12 shows a flowchart of an illustrative process for authenticating a key and performing an operation with a host device in accordance with one embodiment of the invention.

FIG. 12 shows a flowchart of an illustrative process for authenticating a key and performing an operation in accordance with one embodiment of the invention. Process 1200 begins at step 1202. At step 1204, the host device transmits host device identification information to a key. For example, transceiver 308 (FIG. 3) or transceiver 402 (FIG. 4) may transmit host device identification information in response to receiving a communication from a key (i.e., indicating that the host device is within the personal area network created by the key). Processor 302 (FIG. 2) may retrieve host device identification information from storage device 304 (FIG. 3) or memory 306 (FIG. 3), and provide the information to transceiver 308 for transmission.

At step 1206, the host device receives key identification information from the key. For example, transceiver 308 may receive a transmission from the key. Processor 302 may process the transmission and extract key identification information. At step 1208, the host device determines whether the key identification information is known. For example, processor 302 may compare the received key identification information with identification information stored in storage device 304 or memory 306. If the host device determines that the key identification information is not known, process 1200 moves to step 1210, which calls process 1400 (FIG. 14), discussed in more detail below.

If, at step 1208, the host device instead determines that the key identification information is known (e.g., the key identification information was previously stored in storage device 304 or memory 306), process 1200 moves to step 1212. At step 1212, the host device authenticates the key. For example, processor 302 may receive authentication information from the key that processor 302 can compare to data stored for the key in storage device 304 or memory 306. Authentication information may include, for example, a username and password combination, a code, a string created based on a secret seed and a known algorithm (e.g., an RSA-based string), or any other suitable information.

At step 1214, the host device determines whether the key is authenticated. For example, processor 302 may determine whether the authentication information provided by the key was consistent with the information stored in storage device 304 or memory 306. If the host device determines that the key is not authenticated, process 1200 moves to step 1216 and terminates.

If, at step 1214, the host device instead determines that the key is authenticated, process 1200 moves to step 1218. In some embodiments, process 1200 may go straight to step 1218 from step 1212, and skip steps 1214 and 1216. Such an approach may be used, for example, when the identification information transmitted by the key is sufficient to serve as authentication information (e.g., the identification information is sufficiently secret).

At step 1218, the host device identifies one or more operations to perform in response to the key's proximity (i.e., the host device is within the personal area network of the key). For example, processor 302 may identify a process to perform from data stored in storage device 304 or memory 306 that is associated with the key. As another example, transceiver 308 may receive an instruction from the key identifying one or more operations to perform.

At step 1220, the host device performs one or more operations identified at step 1218. For example, processor 302 may direct the components of the host device to perform the one or more operations. As another example, actuator 404 (FIG. 4) may perform an operation. The operations may be any suitable action that the device is operative to perform. Same operations may include, for example, logging a user into the host device, loading a user's profile, preferences or files, activating a switch, calling a device or system (e.g., placing a call with a telephone, or calling an elevator), or any other suitable operation. Process 1200 then ends at step 1216.

Figure 13:
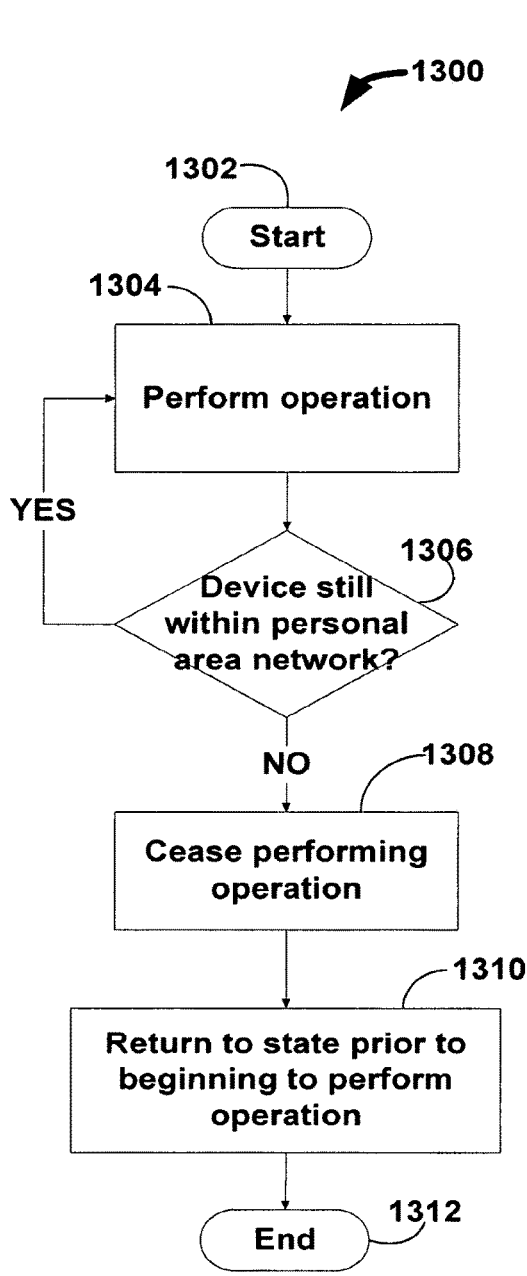
FIG. 13 shows a flowchart of an illustrative process for performing an operation when a host device is within the personal area network created by a key in accordance with one embodiment of the invention.

FIG. 13 shows a flowchart of an illustrative process for performing an operation when a host device is within the personal area network created by a key in accordance with one embodiment of the invention. Process 1300 begins at step 1302. At step 1304, the host device performs an operation. For example, processor 302 (FIG. 3) may direct one or more components of the host device to perform an operation described above in step 1220 of process 1200 (FIG. 12). At step 1306, the host device determines whether the device is still within the personal area network created by the key. For example, transceiver 308 (FIG. 3) or transceiver 402 (FIG. 4) may monitor incoming communications and determine whether it continues to receive communications from the key. As another example, transceiver 308 or transceiver 402 may ping the key and monitor communications for a return communication. If the host device determines that the it is still within the personal area network created by the key, process 1300 returns to step 1304 and continues to perform the operation.

If, at step 1306, the host device instead determines that the host device is no longer within the personal area network of the key, process 1300 moves to step 1308. At step 1308, the host device ceases performing the operation. For example, processor 302 may direct the components of the host device to stop operating. At step 1310, the host device returns to its state prior to beginning to perform the operation. For example, processor 302 may direct one or more components of the host device to return to their previous states (e.g., turn back a switch). Process 1300 then ends at step 1312.

In some embodiments, process 1300 may terminate after step 1308 and skip step 1310. In some embodiments, step 1310 may be skipped based on the operation that was performed. For example, if the operation was to log a user into the host device, or load a user's preferences or profile, step 1310 may serve to log the user out of the system and/or delete the user's files or other personal information. As another example, if the operation was to turn on a vehicle's engine, step 1310 would serve to turn the vehicle off. As still another example, if the operation was to turn on a light or set-up air conditioning or heating, step 1310 may not be used (e.g., the user is still within his home, but not in near proximity to the light switch).

Figure 14:
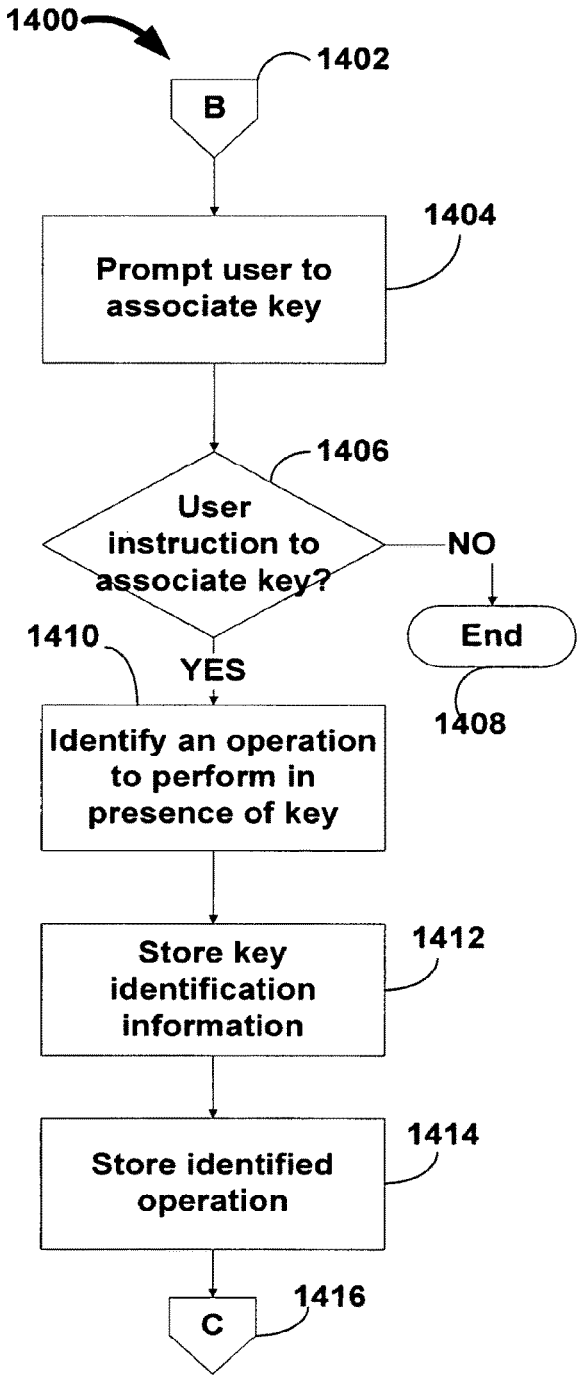
FIG. 14 shows a flow chart of an illustrative process for associating a key with a host device in accordance with one embodiment of the invention.

FIG. 14 shows a flow chart of an illustrative process for associating a key with a host device in accordance with one embodiment of the invention. Process 1400 begins at step 1402. In some embodiments, step 1402 may correspond to step 1210 of process 1200 (FIG. 12). At step 1404, the host device prompts the user to associate a key with the host device. For example, the host device, using transceiver 308 (FIG. 3) or transceiver 402 (FIG. 4), may determine that the host device is within the personal area network of a key. Processor 302 (FIG. 3) may direct a display to provide a prompt for the user. The user may associate the key in any suitable manner. For example, the user may select a key displayed on the host device. As another example, the user may enter identification information (e.g., a unique identifier or an IP address) for the key using an user interface.

At step 1406, the host device determines whether the user has provided an instruction to associate a key. For example, processor 302 may determine whether the user provided an input using the user interface. If the host device determines that the user has not provided any input, or that the user has instructed the host device not to associate the key, process 1400 moves to step 1408 and ends.

If, at step 1406, the host device instead determines that the user has provided an instruction to associate the key with the host device, process 1400 moves to step 1408. At step 1408, the host device identifies an operation to perform when the host device is within the personal area network of the key. For example, processor 302 may automatically select an operation to perform (e.g., turn a light switch on). In some embodiments, the host device may provide a default operation that is selected in the absence of additional instructions from the user. In some embodiments, the user may specify the operation to perform (e.g., using the user interface).

At step 1412, the host devices stores the key's identification information. For example, processor 302 may direct storage device 304 (FIG. 3) or memory 306 (FIG. 3) to store the key's identification information. At step 1414, the host device stores the operation identified at step 1410. For example, processor 302 may store the identified operation in storage device 304 or memory 306. The host device may use any suitable data structure to store one or more keys' identification information, associated operations to perform, and other key-related data. For example, a database in which each key is associated with identifier information and one or more operations associated with the key may be stored in storage device 304 or memory 306. Process 1400 then ends at step 1416, which may be step 1218 of process 1200 (FIG. 12).

In some embodiments, process 1400 may skip steps 1410 and 1414. For example, in approaches where the key directs the host device to perform an operation, the host device may not associate an operation with the key. Instead, each time the key is paired with the host device, the key transmits specific instructions to the host device. This approach may provide benefits when a key is used to cause a plurality of host devices to operate, as the user need only modify the data transmitted by the key using the key's interface to modify the operation of one or more host devices.

The above described embodiments of the present invention are presented for purposes of illustration and not of limitation, and the present invention is limited only by the claims which follow.

What is claimed is:

1. A method for enabling a remote computing device to execute an operation under direction of an electronic key, the method comprising, at the remote computing device:
   broadcasting an identity of the remote computing device;
   establishing a secure communication channel with the electronic key based on an encryption key that is formed between the remote computing device and the electronic key, wherein the remote computing device is operating in accordance with a first state;
   receiving information from the electronic key, wherein the information includes preference data and authentication data associated with the electronic key;
   in response to verifying the authentication data:
      executing at least one operation based on the preference data to cause the remote computing device to perform the at least one operation; and
   in response to detecting a termination of the secure communication channel with the electronic key:
      restoring operation of the remote computing device to the first state.

2. The method of claim 1, wherein the electronic key associates the authentication data and the preference data with the identity of the remote computing device.

3. The method of claim 1, wherein the preference data comprises one or more operations that the remote computing device is capable of executing, and the at least one operation includes the at least one operation.

4. The method of claim 1, wherein the information also includes at least one parameter to be utilized in association with executing the at least one operation on the preference data.

5. The method of claim 1, further comprising, prior to broadcasting the identity of the remote computing device:
   receiving a second identity of the electronic key, wherein the identity of the remote computing device is broadcasted in response to receiving the second identity of the electronic key.

6. The method of claim 1, wherein the secure communication channel is terminated in response to the electronic key satisfying a threshold distance from the remote computing device.

7. The method of claim 1, wherein the secure communication channel is formed using a Wi-Fi connection, a Bluetooth connection, a Nordic connection, high-frequency transmissions, short-range radio circuitry, or infrared.

8. At least one non-transitory computer readable storage medium configured to store instructions that, when executed by at least one processor included in a remote computing device, enable the remote computing device to execute an operation under direction of an electronic key, by carrying out steps that include:
   broadcasting an identity of the remote computing device;
   establishing a secure communication channel with the electronic key based on an encryption key that is formed between the remote computing device and the electronic key, wherein the remote computing device is operating in accordance with a first state;

receiving information from the electronic key, wherein the information includes preference data and authentication data associated with the electronic key;

in response to verifying the authentication data:
executing at least one operation based on the preference data to cause the remote computing device to perform the at least one operation; and in response to detecting a termination of the secure communication channel with the electronic key:
restoring operation of the remote computing device to the first state.

9. The at least one non-transitory computer readable storage medium of claim 8, wherein the electronic key associates the authentication data and the preference data with the identity of the remote computing device.

10. The at least one non-transitory computer readable storage medium of claim 8, wherein the preference data comprises one or more operations that the remote computing device is capable of executing, and the at least one operation includes the at least one operation.

11. The at least one non-transitory computer readable storage medium of claim 8, wherein the information also includes at least one parameter to be utilized in association with executing the at least one operation on the preference data.

12. The at least one non-transitory computer readable storage medium of claim 8, wherein the steps further include, prior to broadcasting the identity of the remote computing device:
receiving a second identity of the electronic key, wherein the identity of the remote computing device is broadcasted in response to receiving the second identity of the electronic key.

13. The at least one non-transitory computer readable storage medium of claim 8, wherein the secure communication channel is terminated in response to the electronic key satisfying a threshold distance from the remote computing device.

14. The at least one non-transitory computer readable storage medium of claim 8, wherein the secure communication channel is formed using a Wi-Fi connection, a Bluetooth connection, a Nordic connection, high-frequency transmissions, short-range radio circuitry, or infrared.

15. A remote computing device configured to execute an operation under direction of an electronic key, the remote computing device comprising:
at least one processor; and
at least one memory storing instructions that, when executed by the at least one processor, cause the remote computing device to perform steps that include:
broadcasting an identity of the remote computing device;
establishing a secure communication channel with the electronic key based on an encryption key that is formed between the remote computing device and the electronic key, wherein the remote computing device is operating in accordance with a first state;
receiving information from the electronic key, wherein the information includes preference data and authentication data associated with the electronic key;
in response to verifying the authentication data:
executing at least one operation based on the preference data to cause the remote computing device to perform the at least one operation; and
in response to detecting a termination of the secure communication channel with the electronic key:
restoring operation of the remote computing device to the first state.

16. The remote computing device of claim 15, wherein the electronic key associates the authentication data and the preference data with the identity of the remote computing device.

17. The remote computing device of claim 15, wherein the preference data comprises one or more operations that the remote computing device is capable of executing, and the at least one operation includes the at least one operation.

18. The remote computing device of claim 15, wherein the information also includes at least one parameter to be utilized in association with executing the at least one operation on the preference data.

19. The remote computing device of claim 15, wherein the at least one processor further causes the remote computing device to perform steps that include, prior to broadcasting the identity of the remote computing device:
receiving a second identity of the electronic key, wherein the identity of the remote computing device is broadcasted in response to receiving the second identity of the electronic key.

20. The remote computing device of claim 15, wherein the secure communication channel is terminated in response to the electronic key satisfying a threshold distance from the remote computing device.

* * * * *